(12) United States Patent
Foley

(10) Patent No.: US 11,683,194 B2
(45) Date of Patent: Jun. 20, 2023

(54) R-PHY MAP ADVANCE TIME MEASUREMENT

(71) Applicant: ARRIS Enterprises LLC, Suwanee, GA (US)

(72) Inventor: Stephen Andrew Foley, North Attleboro, MA (US)

(73) Assignee: ARRIS Enterprises LLC, Suwanee, GA (US)

(*) Notice: Subject to any disclaimer, the term of this patent is extended or adjusted under 35 U.S.C. 154(b) by 93 days.

(21) Appl. No.: 17/105,166

(22) Filed: Nov. 25, 2020

(65) Prior Publication Data
US 2021/0160091 A1 May 27, 2021

Related U.S. Application Data

(60) Provisional application No. 62/940,688, filed on Nov. 26, 2019.

(51) Int. Cl.
*H04L 12/28* (2006.01)
*H04N 21/61* (2011.01)
*H04J 3/06* (2006.01)

(52) U.S. Cl.
CPC ........ *H04L 12/2801* (2013.01); *H04J 3/0682* (2013.01); *H04N 21/6118* (2013.01); *H04N 21/6168* (2013.01); *H04J 3/0667* (2013.01)

(58) Field of Classification Search
CPC .............. H04L 12/2801; H04L 12/2861; H04J 3/1694; H04J 3/0667; H04J 3/0682; H04N 21/6118; H04N 21/6168; H04N 7/102

See application file for complete search history.

(56) References Cited

U.S. PATENT DOCUMENTS

| | | | | |
|---|---|---|---|---|
| 7,145,887 B1* | 12/2006 | Akgun | ................ | H04L 12/2801 370/321 |
| 2010/0002719 A1* | 1/2010 | Sowinski | .............. | H04J 3/1694 370/458 |
| 2015/0295669 A1* | 10/2015 | Chapman | ............ | H04L 12/2801 370/503 |
| 2017/0303273 A1 | 10/2017 | Jin et al. | | |

OTHER PUBLICATIONS

International Search Report and Written Opinion Re: Application No. PCT/US2020/062375 (dated Mar. 17, 2021).

* cited by examiner

*Primary Examiner* — Vinncelas Louis
(74) *Attorney, Agent, or Firm* — Chernoff, Vilhauer, McClung & Stenzel, LLP

(57) ABSTRACT

Systems and methods for dynamically adjusting a MAP advance time for a MAP message sent from a CCAP core to an RPD, the MAP message allocating bandwidth for the RPD during an interval beginning at a start time specified in the MAP message.

13 Claims, 2 Drawing Sheets

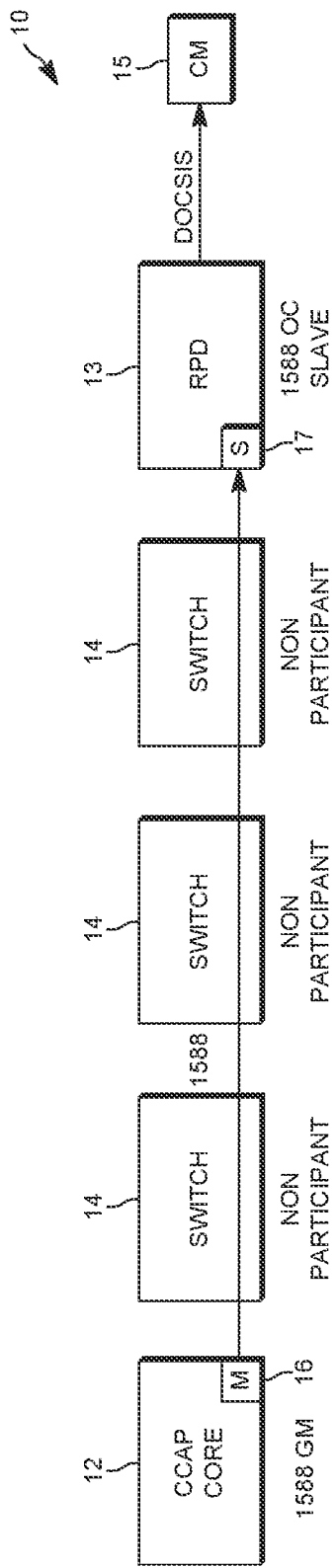
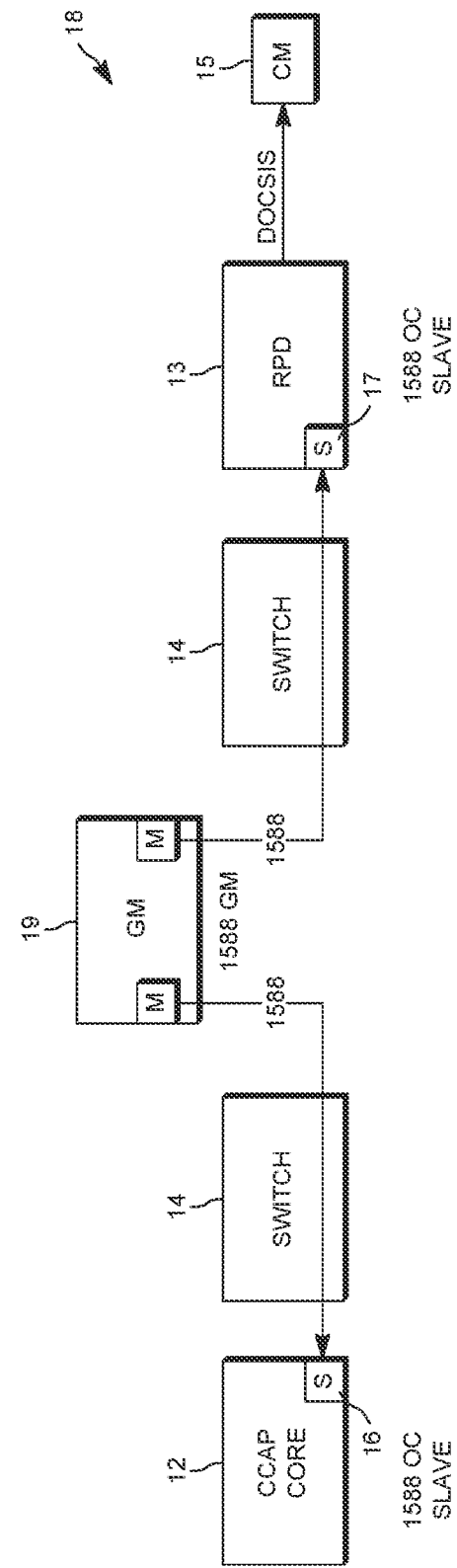

R-PHY MAP ADVANCE TIME MEASUREMENT

CROSS REFERENCE TO RELATED APPLICATIONS

This application claims the benefit of U.S. Provisional Patent Application No. 62/940,688, entitled "R-PHY MAP ADVANCE TIME MEASUREMENT," filed Nov. 26, 2019, which application is hereby incorporated by reference herein.

BACKGROUND

The subject matter of this application generally relates to distributed access architectures of a hybrid CATV network, and more particularly to R-PHY (remote physical) architectures that distribute the functions of the Cable Modem Termination System into the network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

Historically, the head end also included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system (EdgeQAM) in a single platform called the Converged Cable Access Platform (CCAP).

As networks have expanded and head ends have therefore become increasingly congested with equipment, many content providers have recently used distributed architectures to spread the functionality of the CMTS/CCAP throughout the network. This distributed access architecture (DAA) keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CCAP by pushing it to the network's fiber nodes. Thus, while the core in the CCAP performs the higher layer MAC layer processing, the R-PHY device in the node converts the downstream data sent by the core from digital to analog to be transmitted on radio frequency, and converts the upstream RF data sent by cable modems from analog to digital format to be transmitted optically to the core.

Once the functionality of the CMTS/CCAP is divided between a MAC layer in, e.g. a CCAP core and various PHY devices throughout the network, however, synchronously coordinating the transmissions between the downstream cable modems and the CCAP core becomes much more difficult. Specifically, to reduce interference among upstream transmissions, the CCAP sends downstream scheduling messages informing each cable modem of upcoming transmission windows assigned to it, and these scheduling messages must be received a sufficient amount of time before such transmission windows, and close enough to the transmission window so as not to interfere with cable modem performance. Ordinarily, a CCAP would be able to reliably calculate the transmission delay between when it sends such messages and the time a cable modem receives the messages because the conditions between the CCAP and modem typically do not change rapidly. Such rapid changes do exist in an R-PHY system, however. What is therefore desired are improved systems and methods in an R-PHY architecture for determining the delay between the time a MAP message is sent and the time it is received.

BRIEF DESCRIPTION OF THE DRAWINGS

For a better understanding of the invention, and to show how the same may be carried into effect, reference will now be made, by way of example, to the accompanying drawings, in which:

FIGS. 1A and 1B shows exemplary R-PHY architectures where a CCAP core is used to synchronously schedule transmissions to and from a plurality of cable modems.

DETAILED DESCRIPTION

Figure 2:
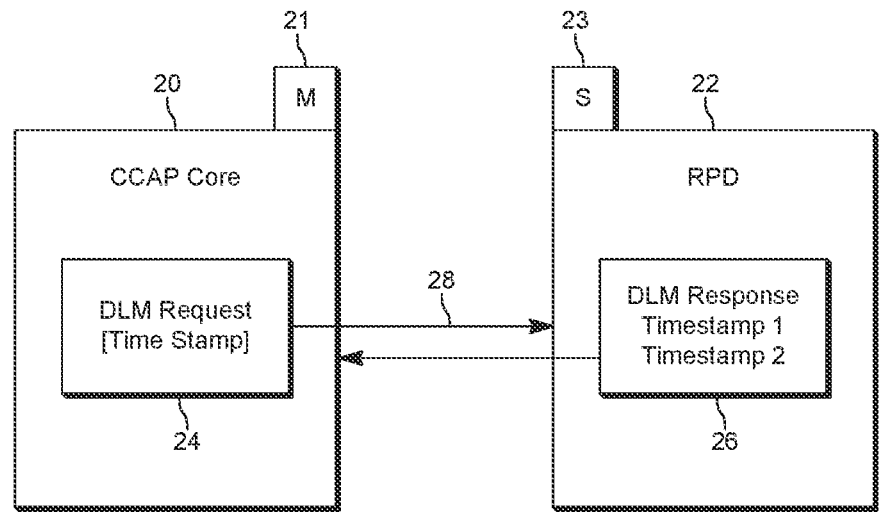
FIG. 2 shows one exemplary timing systems for determining a MAP advance time delay

For purposes of the disclosure and the claims, the following terms are defined to as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Boundary Clock: a clock operates as both a slave and a master by having one port in a slave state receiving time from a master clock, and one or more ports in a master state which disseminate timing information to slaves.

MAP messages: messages sent by the CCAP containing bandwidth allocation maps (MAP). The MAP contains information that indicates when a cable modem can transmit and for how long. The CCAP needs to send MAP messages ahead of time, so the cable modem will not miss the transmit opportunity.

MAP advance time: The amount of time that the CCAP sends the MAP messages ahead of the transmit opportunity of a cable modem.

DOCSIS tics: a unit of time expressed in units of mini-slots since CMTS initialization time, where a mini-slot is 6.25 pec.

As already noted, in R-PHY systems, the clocks of the Remote PHY Devices (RPDs) and the CCAP core must be synchronized in both phase and frequency to properly schedule data transfers between network components. FIG. 1A shows an exemplary topology 10 used to synchronize the devices in an R-PHY architecture. Topology 10 may include a CCAP core 12 synchronized with an RPD 13 connected together via a plurality of network switches 14. The RPD 13 is in turn connected to one or more cable modems 15. Synchronization is attained by a clock 16 in the core 12, acting as a grandmaster clock, which sends timing information to a slave clock 17 in the RPD 13. Those of ordinary skill in the art will appreciate that, although FIG. 1 shows only one RPD 13 connected to the core 12, many such RPDs may be simultaneously connected to the core 12, with each RPD having a slave clock 17 receiving timing information from the grandmaster clock 16 in the core. Those of ordinary skill in the art will also appreciate that an alternative timing architecture could include a separate grandmaster clock.

FIG. 1B shows an alternate topology 18, which differs from the topology 10 in that a separate grandmaster clock 19 is used to synchronize both the clock 16 in the core 12 and the clock 17 in the RPD 13. In this architecture, the clock 16 and the clock 17 operates as a slave to the grandmaster clock 19.

Also as already noted, the CCAP core 12 operates as a MAC layer in an R-PHY system and is responsible for creating and sending periodic downstream MAP packets i.e., scheduling messages to the cable modems 15 so as to coordinate upstream transmissions among the network of cable modems 15. In turn, the cable modems 15 use the received MAP messages to determine when they may each gain access to the upstream channel and transmit packets in the upstream direction. These MAP messages must be received a sufficient amount of time before the transmission windows included in the MAP messages are scheduled to begin. Typically, the CMTS is configured with the maximum time needed for a MAP message to propagate through the HFC network to a cable modem, so that the CMTS can make sure it transmits MAPs early enough to be usable when it arrives at the cable modem. In legacy systems not based on an R-PHY architecture, a CCAP could reliably calculate the maximum transmission delay between when a MAP message is sent and when it will be received by a cable modem because the conditions between the CCAP and a cable modem are mostly known in advance, and because the transmission path between the CCAP and the cable modem is not subject to significant jitter.

In an R-PHY system, however, a variable latency is added in the transmission of a MAP message because the MAC layer and PHY layer of the CMTS are geographically separated by a packet switched network, and this latency often cannot be predicted by an operator. Thus, when the MAC layer prepares a bandwidth MAP and sends it to the PHY layer, it must determine the extra delay of traversing the packet switched network between the MAC and PHY layers when determining how early to send a Bandwidth MAP packet. Knowledge of the delay from the MAC layer to the PHY layer is crucial to the operation and performance of the system.

FIG. 2 shows a method for determining an appropriate MAP advance time in an R-PHY system. In this method, a CCAP core 20 has a master clock 21 used to synchronize its time to that of a slave clock 23 in an RPD 22, ensuring that each of the core 20 and the RPD 22 are synchronized to the same DOCIS tics since CMTS initialization. Those of ordinary skill in the art will appreciate that the master clock 21 may be a grandmaster clock or may in turn be a boundary clock that is a slave to a separate grandmaster clock.

The CCAP core 28 may utilize a DEPI Latency Measurement (DLM) message exchange protocol, which uses Downstream External PHY Interface (DEPI) messages that serve to measure the latency between the CCAP Core 20 and RPD 22. Specifically, the CCAP Core 20 sends a DLM request message 24 to the RPD 22. Before transmitting the DLM request message 24 on the packet switched network, the CCAP Core 20 writes a timestamp in the packet, recording the CCAP Core transmit time of the packet. The units for this timestamp are preferably DOC SIS ticks. When the DLM request 24 arrives at the RPD 22, the RPD 22 records the time of packet arrival. The RPD 22 then forms a DLM response message 26, which contains the timestamp from the CCAP Core 22 and a timestamp representing the time of packet arrival at the RPD 22—both in units of DOC SIS ticks. The RPD 22 then transmits this DLM response to the CCAP Core, which then subtracts the CCAP Core timestamp from the RPD timestamp, and thereby get a resultant value which is the one-way latency 28 from the CCAP Core 20 to the RPD 22 in DOCSIS ticks. This time can be converted to units of seconds. Once the CCAP Core 20 has the latency measurement, it can make estimates of the other delays in the time it takes for the Bandwidth MAP packet to make it from the CCAP Core 20 to the cable modem, and use these estimates along with the measure of the latency from the CCAP Core 20 to the RPD 22 to determine the ideal time to transmit a Bandwidth MAP to have it arrive at a cable modem within tolerance.

The method shown in FIG. 2 may have several disadvantages. First, DLM requires extra dataplane messages to achieve its goal. Second, DLM requires extensive changes on the CCAP Core and RPD to be able to format and process DLM messages and handle message error scenarios. In addition, the CCAP Core needs to track periodically sent messages and outstanding messages. Third, a CCAP Core may be connected to hundreds of RPDs. Periodically sending a DLM request and processing a DLM response from potentially hundreds of RPDs may overwhelm the processing capability of the CCAP Core.

Figure 3:
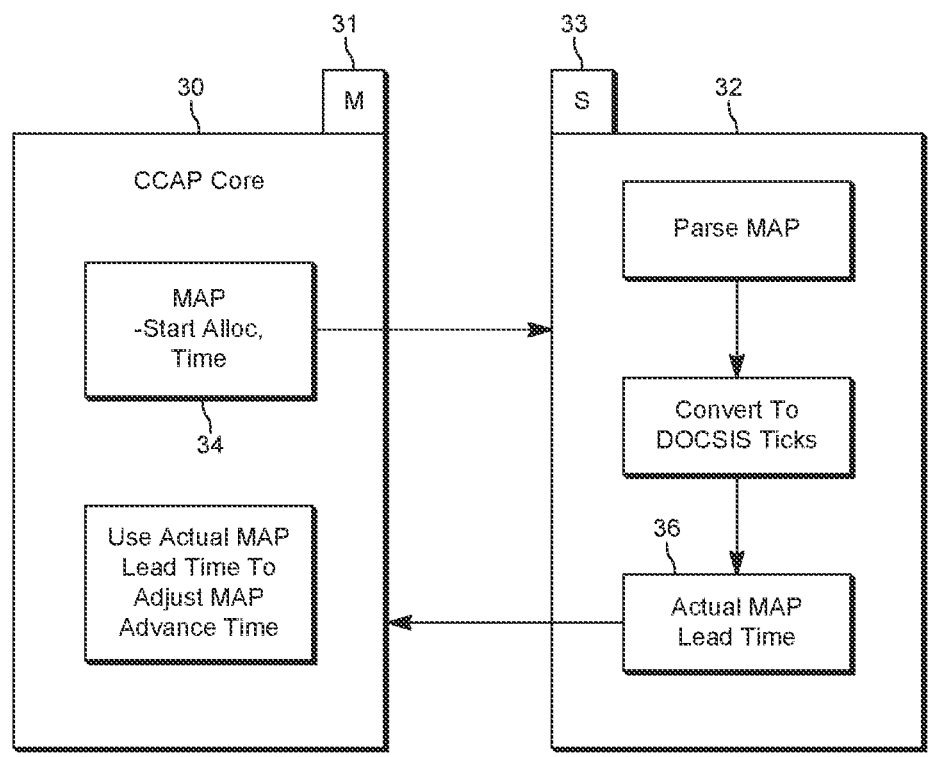
FIG. 3 shows an alternate timing system for determining a MAP advance time delay.

FIG. 3 shows an alternate system and method for determining an appropriate MAP advance time in an R-PHY system, which instead of exchanging separate messages devoted to measuring the packet delay from a CCAP core 30 to an RPD 32, uses data from the MAP messages themselves to estimate delay and adjust a MAP advance time accordingly. MAP messages include a MAP allocation start time, which is the start time of the temporal window for which the MAP allocates bandwidth. By examining the map allocation start time in a received MAP and comparing it to the time the RPD transmits the received MAP message to downstream cable modems, an RPD can determine the actual measured "HFC map lead time," which is the receipt time relative to the MAP allocation start time. The RPD 32 can record, store, and report this data as needed back to the CCAP core 30. When determining its MAP advance time, i.e. the time that the CCAP core calculates that it should send a MAP message in advance of the window for which the MAP is applicable, the CCAP core will have made certain assumptions about the latency between the MAC layer and PHY layer, and from those assumptions determine an expected HFC map lead time by which the RPD will have been expected to have received the MAP and relayed it downstream to a cable modem. The MAC layer device can compare the measured HFC map lead time that is reported by the PHY layer device, to its own expected HFC map lead time. From this comparison the MAC layer can determine if its assumed latency is correct or not, and can adjust the assumed latency until the expected HFC map lead time matches the measured HFC map lead time.

Specifically, a system may include a CCAP core 30 with a master clock 31 connected via a packet switched network to an RPD 32 having a slave clock 33. The master clock 31 and the slave clock 33 ensure that each of the core 30 and the RPD 32 are synchronized to the same DOCIS tics since CMTS initialization. The CCAP core 30 may construct a MAP message 34 which includes a start time for the window that the MAP allocates bandwidth, recorded as a start_alloc_time_mini_slots. The MAP message is transmitted to the RPD 32, which would ordinarily pass the MAP message downstream onto its RF port. Prior to doing so, however, the RPD 23 parses the MAP message to retrieve the start_alloc_time_mini_slots, and records that value along with a time stamp for receipt of the MAP message, pkt_arrival_time_docsis_tick.

The start_alloc_time_mini_slots value in the Bandwidth MAP packet is expressed in units of mini-slots since CMTS initialization time. The RPD 32 preferably converts this time stamp into units of DOCSIS ticks since CMTS initialization. This can be done by looking at the "mini-slot size" associated with the MAP, which is configured on the RPD 32 by the CCAP Core 30 at RPD initialization. The configured mini-slot size parameter is the size of a single mini-slot in DOCSIS ticks. Thus, the start_alloc_time_mini_slots in the Bandwidth MAP packet is multiplied by the mini-slot size to give the resultant alloc start time expressed in DOCSIS ticks which is stored as map_alloc_start_time_docsis_tick. The RPD may also estimate the time it takes from recordation of the pkt_arrival_time_docsis_tick to the time that the Bandwidth MAP packet is actually transmitted downstream on its RF port. This estimate is fairly constant for the RPD 32, as the processing time for Bandwidth MAP packets does not vary much over time. This constant is also preferably expressed in units of DOCSIS ticks and may be denoted as est_processing_time_docsis_ticks.

A time expressed in units of DOCSIS ticks can be converted to seconds via multiplying by the constant seconds_per_docsis_tick, which is equal to 1/10240000. Thus, the RPD can create a message 36 comprising the time in seconds that the RPD 32 actually received the MAP message 34 in advance of the MAP start allocation time via the following formula:

hfc_map_lead_time_secs=(map_alloc_start_time_docsis_tick−(pkt_arrival_time_docsis_tick+est_processing_time_docs_tick))*seconds_per_docsis_tick.

The message 36 may then be sent to the CCAP core 30 which may use the measured MAP lead time to dynamically adjust its MAP advance time. In some embodiments, the CCAP core 30 may examine the recorded samples and determine if the measured HFC map lead time is within a tolerance threshold for a portion of the RF plant attached to the reporting RPD 32. If the HFC map lead time is out of tolerance, the CCAP Core 30 can take a number of actions, including but not limited to (i) alerting the operator via logging or other user interface; (ii) adjusting its internal algorithms for how early to transmit Bandwidth MAPs to the RPD for the purpose of bringing the HFC map lead time back into tolerance; and (iii) collecting and storing data for later analysis to allow for identifying network issues and debugging.

In some embodiments, the RPD 32 may examine a MAP packet periodically and record the HFC map lead time for these packets. Each HFC map lead time is recorded a sample in a database and stored on the RPD 32. The RPD 32 may in some embodiments store the most recent X samples for retrieval by the CCAP Core 30 or a cable operator. The RPD 32 may provide storage for a number of samples, because the latency of the network between the CCAP Core 30 and the RPD 32 can vary over time based on routing, congestion, and other factors.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A Converged Cable Access Platform (CCAP) core in an R-PHY architecture that sequentially sends a plurality of bandwidth MAP messages to a Remote Physical Device (RPD), each MAP message sent at a time based on a calculated MAP advance time and each MAP message allocating bandwidth for the RPD during an interval beginning at a start time specified in the MAP message, the CCAP core capable of dynamically adjusting the MAP advance time using a measured parameter received within a message from the RPD, where the measured parameter is based on difference between the start time in the MAP message and a measurement of the time that the RPD received the MAP message from the CCAP core, and where the measured parameter is further based on an estimated time it takes from recordation of the pkt_arrival_time_docsis_tick at the RPD to the time that a Bandwidth MAP packet is actually transmitted downstream on an RF port of the RPD.

2. The CCAP core of claim 1 where the measured parameter is expressed in units of time.

3. The CCAP core of claim 1 where the MAP advance time is based on an estimated value for the measured parameter and the MAP advance time is dynamically adjusted until the estimated parameter is within a specified threshold amount of the measured parameter.

4. The CCAP core of claim 1 where the MAP advance time is adjusted if the measured parameter is outside a tolerance threshold for a portion of the RF plant attached to the RPD.

5. A Remote Physical Device (RPD) in an R-PHY architecture that sequentially receives a plurality of bandwidth MAP messages from a Converged Cable Access Platform (CCAP) core, each MAP message allocating bandwidth for the RPD during an interval beginning at a start time specified in the MAP message, the RPD capable of processing the MAP message to measure a parameter and sending the parameter in a message to the CCAP core, where the measured parameter is based on difference between the start time in the MAP message and a measurement of the time that the RPD received the MAP message from the CCAP core, and where the measured parameter is further based on an estimated time it takes from recordation of the pkt_arrival_time_docsis_tick at the RPD to the time that a Bandwidth MAP packet is actually transmitted downstream on an RF port of the RPD.

6. The RPD of claim 5 where the start time in the MAP message is expressed in DOCSIS minislots and the RPD converts the time to seconds.

7. The RPD of claim 6 where the RPD converts the time to seconds using a configured parameter for the number of DOCSIS ticks per minislot and the number of seconds per DOCSIS tics.

8. The RPD of claim 5 where the parameter is measured periodically and stored in a table.

9. The RPD of claim 8 where the plurality of bandwidth MAP messages are constructed using the table upon request from the CCAP core.

10. A method for dynamically adjusting a MAP advance time for a MAP message sent from a Converged Cable Access Platform (CCAP) core to a Remote Physical Device (RPD), the MAP message allocating bandwidth for the RPD during an interval beginning at a start time specified in the MAP message, the method comprising:
   sending the MAP message from the CCAP core to the RPD;
   parsing, in the RPD the map message to measure a delay in transmission of the MAP message from the CCAP core to the RPD;
   using the measured delay to send a return message to the CCAP core; and
   the CCAP core using the return message to dynamically adjust the MAP advance time; where
   the return message includes a parameter measured periodically and stored in a table, the parameter based on an estimated time it takes from recordation of the pkt_arrival_time_docsis_tick at the RPD to the time that a Bandwidth MAP packet is actually transmitted downstream on an RF port of the RPD.

11. The method of claim 10 where the start time in the MAP message is expressed in DOCSIS minislots and the RPD converts the time to seconds.

12. The method of claim 11 where the RPD converts the time to seconds using a configured parameter for the number of DOCSIS ticks per minislot and the number of seconds per DOCSIS tics.

13. The method of claim 10 where the return message is constructed using the table and upon request from the CCAP core.

* * * * *